US012646000B2

(12) United States Patent
Smith et al.

(10) Patent No.: US 12,646,000 B2
(45) Date of Patent: Jun. 2, 2026

(54) SYSTEMS AND METHODS FOR STATE CHANGE IMPLEMENTATION

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/415,034

(22) Filed: Jan. 17, 2024

(65) Prior Publication Data

US 2025/0232213 A1 Jul. 17, 2025

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

FOREIGN PATENT DOCUMENTS

| | | |
|---|---|---|
| CN | 109858970 B | 7/2021 |
| CN | 111047044 B | 2/2022 |
| JP | 6278918 B2 | 2/2018 |

OTHER PUBLICATIONS

Rosendin, et al, Forecasting Monthly Active Users for Adobe Creative Cloud Products, [received May 23, 2024]. Retrieved from Internet:<chrome-extension://efaidnbmnnnibpcajpcglclefindmkaj/https://mrosendin.github.io/mau-predictor/paper.pdf> (Year: 2018).*
Redondo, et al, Analysis of Remotely Sensed Images Through Social Media, [received May 23, 2024]. Retrieved from internet:<https://ieeexplore.ieee.org/abstract/document/9364356> (Year: 021).*
He, et al, A Method to Cloud Computing Resources Requirement Prediction on SaaS Application, [received May 23, 2024]. Retrieved from Internet:<https://ieeexplore.ieee.org/abstract/document/9611746> (Year: 2021).*
Schueller, et al, Evolving collaboration, dependencies, and use in the Rust Open Source Software ecosystem, [received May 23, 2024]. Retrieved from Internet:<https://www.nature.com/articles/s41597-022-01819-z> (Year: 2022).*
Tsagkis, et al, Analysing urban growth using machine learning and open data: An artificial neural network modelled case study of five Greek cities, [received May 23, 2024]. Retrieved from Internet:<https://www.sciencedirect.com/science/article/pii/S2210670722006412> (Year: 2023).*

(Continued)

*Primary Examiner* — Miranda M Huang
*Assistant Examiner* — Bart I Rylander
(74) *Attorney, Agent, or Firm* — Caldwell LLC

(57) ABSTRACT

Described herein are systems and methods for state change implementation. In some embodiments, an apparatus may obtain system data and classify the system data to descriptors. In some embodiments, an apparatus may determine descriptor ratios as a function of the elements of system data classified to descriptors, weightings associated with the elements of system data, or both. In some embodiments, an apparatus may determine a growth model as a function of a plurality of descriptor ratios.

20 Claims, 6 Drawing Sheets

(56)  References Cited

OTHER PUBLICATIONS

Zekic-Susac, et al, Predicting company growth using logistic regression and neural networks, [received May 23, 2024]. Retrieved from Internet:<https://hrcak.srce.hr/clanak/257100> (Year: 2016).*

Huang, J., et al, A Multiplexed Network for End-to-End, Multilingual OCR, [received Jul. 17, 2024]. Retrieved from Internet:<https://openaccess.thecvf.com/content/CVPR2021/html/Huang_A_Multiplexed_Network_for_End-to-End_Multilingual_OCR_CVPR_2021_paper.html> (Year: 2021).*

Yao, et al, Adaptive Retraining for Neural Network Robustness in Classification, [received Oct. 29, 2024]. Retrieved from Internet:<https://ieeexplore.ieee.org/abstract/document/9534294?casa_token=Hz2olUtZ0j0AAAAA:UTP6JqB2_4SqovoeMfMjr3YRjbneQLHpSzSHnOXyS3s4oHdPCwjCa4QSthg4c0HKu_J7Pu6E> (Year: 2021).*

Monaco, J., Device Fingerprinting with Peripheral Timestamps, [received Mar. 3, 2025]. Retrieved from Internet:<https://ieeexplore.ieee.org/abstract/document/9833612?casa_token=KPahELe_vAwAAAAA:1WUWqmW_QO0q4Z2CDniLMtgHE6sJhlVrdVaD0reoaQjI0NEM3oGF656lp-SOZOWn3VNmwAZb> (Year: 2022).*

* cited by examiner

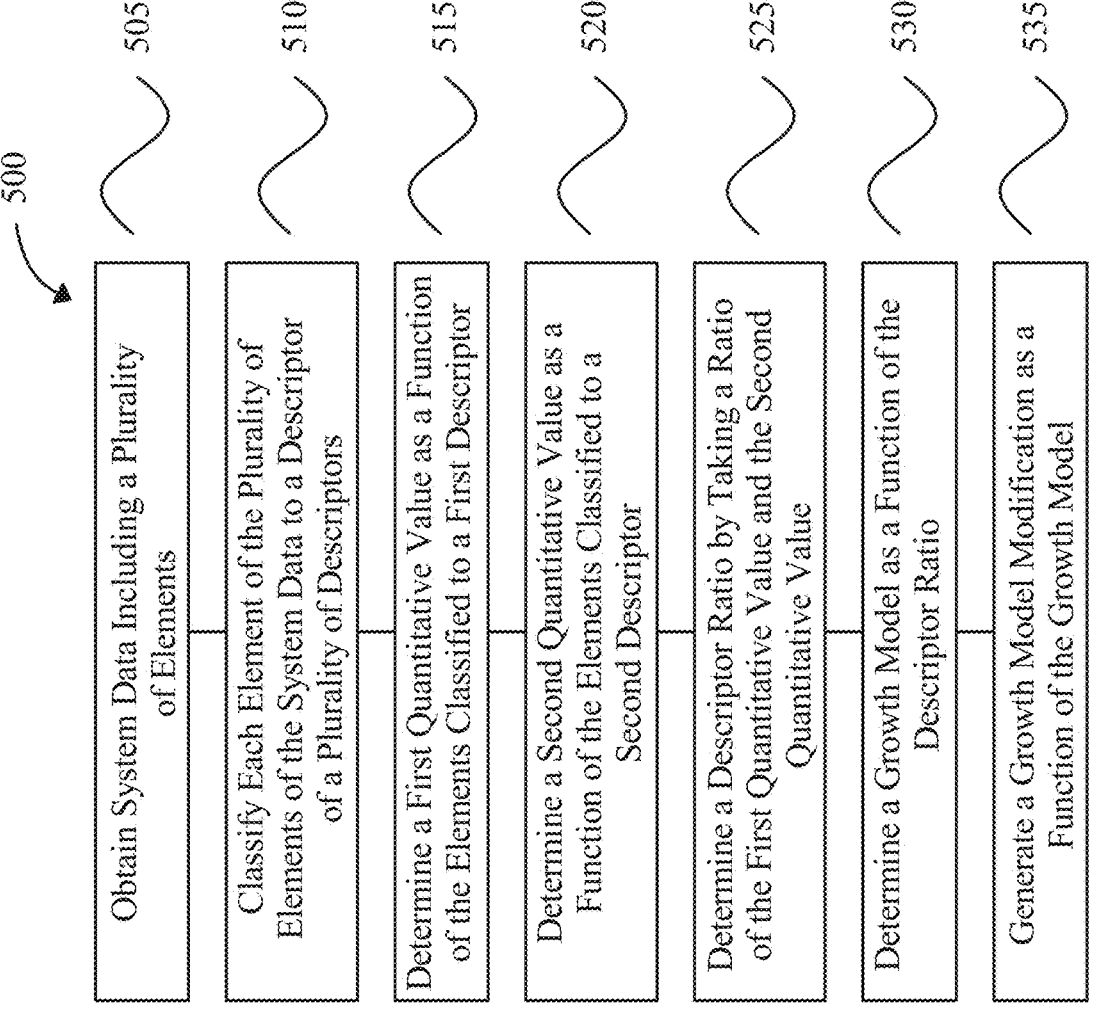

500

Obtain System Data Including a Plurality of Elements ⟶ 505

Classify Each Element of the Plurality of Elements of the System Data to a Descriptor of a Plurality of Descriptors ⟶ 510

Determine a First Quantitative Value as a Function of the Elements Classified to a First Descriptor ⟶ 515

Determine a Second Quantitative Value as a Function of the Elements Classified to a Second Descriptor ⟶ 520

Determine a Descriptor Ratio by Taking a Ratio of the First Quantitative Value and the Second Quantitative Value ⟶ 525

Determine a Growth Model as a Function of the Descriptor Ratio ⟶ 530

Generate a Growth Model Modification as a Function of the Growth Model ⟶ 535

*FIG. 5*

SYSTEMS AND METHODS FOR STATE CHANGE IMPLEMENTATION

FIELD OF THE INVENTION

The present invention generally relates to the field of state change implementation. In particular, the present invention is directed to systems and methods for state change implementation.

BACKGROUND

Current methods for state change implementation may be insufficient, for example, in that they may fail to make use of machine learning tools in classifying data.

SUMMARY OF THE DISCLOSURE

In an aspect, an apparatus for state change implementation includes at least a processor and a memory communicatively connected to the at least processor, the memory containing instructions configuring the at least processor to obtain system data including a plurality of elements, classify each element of the plurality of elements of the system data to a descriptor of a plurality of descriptors, determine a first quantitative value as a function of the elements classified to a first descriptor, determine a second quantitative value as a function of the elements classified to a second descriptor, determine a descriptor ratio by taking a ratio of the first quantitative value and the second quantitative value.

In another aspect, a method for state change implementation includes using at least a processor, obtaining system data including a plurality of elements, using at least a processor, classifying each element of the plurality of elements of the system data to a descriptor of a plurality of descriptors, using at least a processor, determining a first quantitative value as a function of the elements classified to a first descriptor, using at least a processor, determining a second quantitative value as a function of the elements classified to a second descriptor, using at least a processor, determining a descriptor ratio by taking a ratio of the first quantitative value and the second quantitative value, using at least a processor, determining a growth model as a function of the descriptor ratio, and using at least a processor, generating a growth model modification as a function of the growth model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 is a diagram depicting an exemplary method of state change implementation;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for state change implementation. In some embodiments, an apparatus may obtain system data, classify the system data to descriptors, determine quantitative values based on those descriptors, determine descriptor ratios as a function of the quantitative values, determine a growth model as a function of descriptor ratios, and generate a growth model modification as a function of the growth model.

Figure 1:
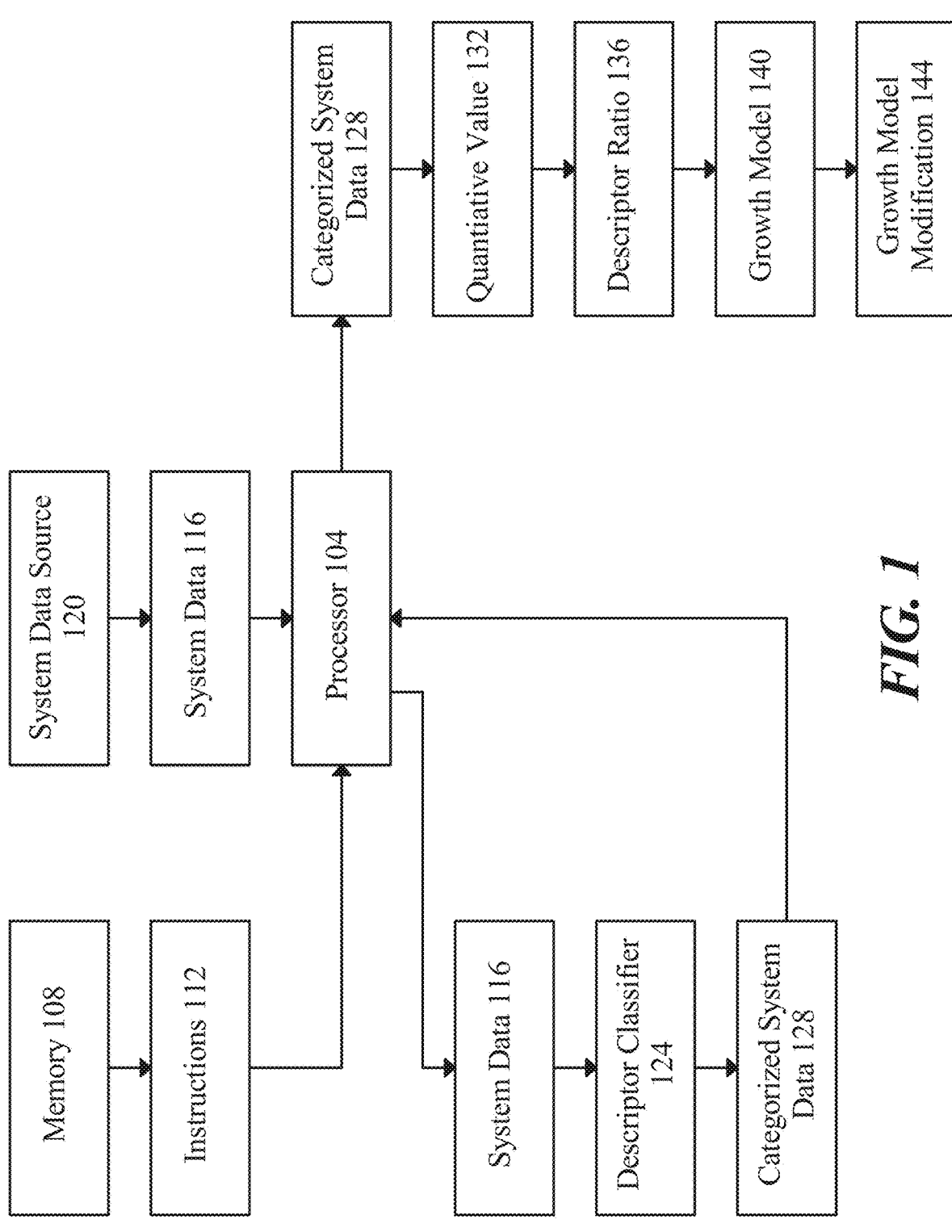
FIG. 1 is a diagram depicting an exemplary apparatus for state change implementation.

Referring now to FIG. 1, an exemplary embodiment of an apparatus 100 for state change implementation is illustrated. Apparatus 100 may include a computing device. Apparatus 100 may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may include at least a processor 104 and a memory 108 communicatively connected to the at least a processor 104, the memory 108 containing instructions 112 configuring the at least a processor 104 to perform one or more processes described herein. Computing devices including memory 108 and at least a processor 104 are described in further detail herein.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may obtain system data 116 including a plurality of elements. In some embodiments, apparatus 100 may include at least a processor 104 and memory 108 communicatively connected to the at least processor 104, the memory 108 containing instructions 112 configuring the at least processor 104 to obtain system data 116 including a plurality of elements.

Still referring to FIG. 1, as used herein, "system data" is data representing the state of a system. In some embodiments, system data may include specific instances of data which may be categorized into descriptors, as described below. Several examples of system data are described herein. In some embodiments, system data 116 may be received from a system data source 120. As used herein, a "system data source" is a process, entity, user, memory, or data structure containing system data. In some embodiments, system data source 120 may include one or more user devices, databases, computing devices, and/or users. In non-limiting examples, user devices may include smartphones, smartwatches, tablets, and computers. In some embodiments, a system data source 120 may include a physical or digital form such as a form on a website or in an application. Exemplary forms include forms requesting the status of outstanding bills. As another non-limiting example, a system data source 120 may include a computing device configured to receive system data 116 using digital tracking, such as gathering information using a device fingerprint that allows a user device to be tracked across the internet. As a non-limiting example, a device fingerprint may allow a user device to be tracked across the internet such as to social media websites. In some embodiments, system data 116 may be received from a third party. In a non-limiting example, a third party may operate a database including system data 116, processor 104 may request system data 116 from the database using an application programming interface (API), and processor 104 may receive from the database, or a computing device associated with the database, system data 116.

Still referring to FIG. 1, system data 116 may be input through an interface. An interface may include a graphical user interface (GUI). An interface may include a touchscreen GUI interface. An interface may include a computing device configured to receive an input from a user. In some embodiments. an interface may be configured to prompt a user for an input. In a non-limiting example, an interface may request that a user input information indicating the number of downloads of a particular software package in a particular month.

Still referring to FIG. 1, in some embodiments, a system data source 120 may include a web crawler or may store system data 116 obtained using a web crawler. A web crawler may be configured to automatically search and collect information related to a user, entity, or topic, such as a user, entity, or topic about which system data is to be collected. As used herein, a "web crawler" is a program that systematically browses the internet for the purpose of web indexing. The web crawler may be seeded with platform URLs, wherein the crawler may then visit the next related URL, retrieve the content, index the content, and/or measures the relevance of the content to the topic of interest. In one embodiment, the web crawler may be configured to scrape system data 116 from user related social media and networking platforms. The web crawler may be trained with information received from a user through a user interface. As a non-limiting example, a user may input into a user interface, social media platforms they have accounts on and would like to retrieve user data from. A user interface may include a graphical user interface (GUI), command line interface (CLI), menu-driven user interface, touch user interface, voice user interface (VUI), form-based user interface, and the like. Processor may receive system data 116 including information such as a user's name, user's profile, platform handles, platforms associated with the user, mentions of a particular brand, data which may be used to verify data input by a user and the like. In some embodiments, a web crawler may be configured to generate a web query. A web query may include search criteria. Search criteria may include photos, videos, audio, user account handles, web page addresses and the like received from the user. A web crawler function may be configured to search for and/or detect one or more data patterns. A "data pattern" as used in this disclosure is any repeating forms of information. A data pattern may include, but is not limited to, features, phrases, and the like as described further below in this disclosure.

Still referring to FIG. 1, in some embodiments, a web crawler may work in tandem with a program designed to interpret information retrieved using a web crawler. As a non-limiting example, a machine learning model may be used to generate a new query as a function of prior search results. As another non-limiting example, data may be processed into another form, such as by using optical character recognition to interpret images of text. In some embodiments, a web crawler may be configured to determine the relevancy of a data pattern. Relevancy may be determined by a relevancy score. A relevancy score may be automatically generated by processor 104, received from a machine learning model, and/or received from a user. In some embodiments, a relevancy score may include a range of numerical values that may correspond to a relevancy strength of data received from a web crawler function. As a non-limiting example, a web crawler function may search the Internet for data related to mentions of a particular brand associated with a user. In some embodiments, computing device may determine a relevancy score of system data 116 retrieved by a web crawler.

Still referring to FIG. 1, in some embodiments, a variable may be converted into a different form. Data formats may be converted in a variety of ways, such as without limitation, using a speech to text function or using optical character recognition. In some embodiments, system data 116 may be converted into a different form such that it is in a form appropriate for input into a function. As a non-limiting example, descriptor classifier 124 may only accept inputs in a particular format, and system data 116 may be converted into that format such that it may be effectively input into descriptor classifier 124.

Still referring to FIG. 1, data may also be altered such that it retains the same format but is more likely to produce successful or relevant results. As a non-limiting example, a machine learning model may be used to replace obscure words in a text file with more common words that have similar or identical meanings. In this example, this may be done by training a machine learning model on samples of text using unsupervised learning such that the machine learning model learns associations between words (such as based on how frequently they are used together). In this example, words may be represented as vectors with dimensions indicating their relationship to other words, and whether words are synonyms may be determined based on how similar their vectors are (as in, if vectors representing 2 words point in the same direction, those words may be synonyms). In this example, a first word determined to be similar to or a synonym of a second word, may be replaced by the second word.

Still referring to FIG. 1, in some embodiments, system data 116 may be processed using optical character recognition. In some embodiments, optical character recognition or optical character reader (OCR) includes automatic conversion of images of written (e.g., typed, handwritten or printed text) into machine-encoded text. In some cases, recognition of at least a keyword from system data 116 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of system data 116. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to system data 116 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of system data 116. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of system data 116.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of system data 116. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes system data 116. Since the adaptive classifier may have learned something useful a little too late to recognize characters on the first pass, a second pass is run over the system data 116. Second pass may include adaptive recognition and use characters recognized with high confidence on the first pass to recognize better remaining characters on the second pass. In some cases, two-pass approach may be advantageous for unusual fonts or low-quality system data 116. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of system data 116. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, system data 116 may be processed using automatic speech recognition. In some embodiments, automatic speech recognition may require training (i.e., enrollment). In some cases, training an automatic speech recognition model may require an individual speaker to read text or isolated vocabulary. In some cases, speech training data may include an audio component having an audible verbal content, the contents of which are known a priori by a computing device. Computing device may then train an automatic speech recognition model according to training data which includes audible verbal content correlated to known content. In this way, computing device may analyze a person's specific voice and train an automatic speech recognition model to the person's speech, resulting in increased accuracy. Alternatively, or additionally, in some cases, computing device may include an automatic speech recognition model that is speaker independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, computing device may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within system data 116, but others may speak as well.

Still referring to FIG. 1, in some embodiments, an automatic speech recognition process may include one or all of acoustic modeling, language modeling, and statistically based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics-indeed, any data that can be turned into a linear representation can be analyzed with DTW. In some cases, DTW may be used by an automatic speech recognition process to cope with different speaking (i.e., audible verbal content) speeds. In some cases, DTW may allow computing device to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 2-4. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks (TDNN's) may be used for automatic speech recognition, for example over longer time intervals for continuous speech recognition.

Still referring to FIG. 1, in some embodiments, apparatus 100 may include at least a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

Still referring to FIG. 1, in some embodiments, apparatus 100 may include a machine vision system. In some embodiments, a machine vision system may include at least a camera. A machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, an exemplary machine vision camera is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Still referring to FIG. 1, in some embodiments, a language model may be used to process system data 116. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in system data 116 by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from system data 116 with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and a feature of an entity operating apparatus 100, such as an association between the words "worked" and "out" with having gone to the gym. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in system data 116 using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in system data 116 using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes/th/,/ă/, and/t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 104, or another computing device. Language classification training data may create associations between any type of language element in any format and other type of language element in any format. Additionally, or alternatively, language classification training data may associate language element input data to functionality related to an operator of apparatus 100. For example, language classification training data may associate occurrences of the syntactic elements "went," "and," "worked," and "out," in a single sentence with the feature of having gone to the gym.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B) = P(B/A) P(A) = P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data.

Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, in some embodiments, apparatus 100 may classify each element of the plurality of elements of the system data 116 to a descriptor of a plurality of descriptors. In some embodiments, apparatus 100 may include at least a processor 104 and memory 108 communicatively connected to the at least processor 104, the memory 108 containing instructions 112 configuring the at least processor 104 to classify each element of the plurality of elements of the system data 116 to a descriptor of a plurality of descriptors. In some embodiments, processor 104 may input elements of system data 116 into descriptor classifier 124 and may receive categorized system data 128.

Still referring to FIG. 1, as used herein, a "descriptor" is a category into which system data may be classified. In some embodiments, a descriptor may be part of a plurality of descriptors into which an element of system data may be classified. As a non-limiting example, a descriptor may be associated with mentions of a particular brand on social media. In this example, elements of system data categorized to the descriptor may include specific mentions of the brand on social media. In this example, the descriptor may be one of a plurality of descriptors, each associated with mentions of different brands, groups of brands, or the like on social media. As another non-limiting example, a descriptor may be associated with the days an individual went to the gym. In this example, elements of system data categorized to the descriptor may include specific days the individual went to the gym. In this example, the descriptor may be one of a plurality of descriptors which may also include, for example, a descriptor associated with days the individual did not go to the gym.

Still referring to FIG. 1, in some embodiments, a machine learning model may be used to categorize elements of system data to descriptors. In some embodiments, a descriptor classifier 124 may be used to categorize elements of system data to descriptors. In some embodiments, descriptor classifier 124 may be trained using a machine learning classification algorithm. In some embodiments, a specialized descriptor classifier may be trained for each set of descriptors to which elements of system data are to be categorized to. In a non-limiting example, a first descriptor classifier may be trained to classify elements of system data between descriptors associated with social media mentions of different brands (as in the example above), and a second descriptor classifier may be trained to classify elements of system data between descriptors associated with whether or not an individual went to the gym on a certain day (as described in the example above). In some embodiments, descriptor classifier 124 may be trained using a data set including elements of historical system data, each associated with a descriptor. In some embodiments, descriptor classifier 124 may receive as an input an element of system data and may output a categorization to a descriptor.

Still referring to FIG. 1, in some embodiments, processor 104 may determine categorization of elements of system data 116. For example, in some situations, system data may be collected in a form such that it is associated with data from which descriptor categorization may be determined. In a non-limiting example, descriptors may include whether or not an individual went to the gym on a day, and elements of system data may be collected from an API associated with an app that tracks workouts. In this example, for each day where a workout was recorded, processor 104 may categorize the associated element of system data to a descriptor associated with having gone to the gym, and for each day where no workout was recorded, processor 104 may categorize the associated element of system data to a descriptor associated with not having gone to the gym. In some embodiments, elements of system data may be associated with or may include additional data elements, and processor may categorize elements of system data according to such associated or included additional data elements.

Still referring to FIG. 1, in some embodiments, an element of system data may be categorized to one descriptor. In some embodiments, an element of system data may be categorized to a plurality of descriptors. In a non-limiting example, an element of system data representing a mention of a certain brand on social media may be categorized to a first descriptor associated with mentions of that brand on social media, and to a second descriptor associated with social media mentions of a category of brands of which that brand is a member.

Still referring to FIG. 1, in some embodiments, apparatus 100 may determine a first quantitative value 132 as a function of the elements classified to a first descriptor. In some embodiments, apparatus 100 may include at least a processor 104 and memory 108 communicatively connected to the at least processor 104, the memory 108 containing instructions 112 configuring the at least processor 104 to determine a first quantitative value 132 as a function of the elements classified to a first descriptor.

Still referring to FIG. 1, in some embodiments, apparatus 100 may determine a second quantitative value 132 as a function of the elements classified to a first descriptor. In some embodiments, apparatus 100 may include at least a processor 104 and memory 108 communicatively connected to the at least processor 104, the memory 108 containing instructions 112 configuring the at least processor 104 to determine a second quantitative value 132 as a function of the elements classified to a first descriptor. In some embodiments, processor 104 may calculate more than two quantitative values. In non-limiting examples, processor 104 may calculate 3, 4, 5, 6, 7, 8, 9, 10, or more quantitative values.

Still referring to FIG. 1, in some embodiments, processor 104 may determine a quantitative value 132 as a function of categorized system data 128. As used herein, a "quantitative value" is a value calculated based on the elements of system data associated with a descriptor, weightings associated with the elements of system data associated with a descriptor, or both. In some embodiments, a quantitative value may be calculated by finding the number of elements of system data categorized to a certain descriptor. In a non-limiting example, elements of system data, each representing an individual day, may be categorized to a descriptor associated with whether or not a particular user went to the gym on that day. In this example, a quantitative value may be calculated by finding the number of elements of system data categorized to a descriptor associated with the user having gone to the gym on the day in question. In this example, a quantitative value may represent the number of times the user went to the gym. In some embodiments, a quantitative value may be calculated based on a subset of elements associated with a descriptor. In the previous example, a quantitative value may be found by finding the number of elements of system data representing days of a particular month and year that are categorized to a descriptor associated with the user having gone to the gym on the day in question. In this example, a quantitative value may represent the number of times the user went to the gym in a particular month. In some embodiments, a quantitative value may be based on elements of system data categorized to all of a set of descriptors. In some embodiments, a quantitative value may be based on elements of system data categorized to any of a set of descriptors. In a non-limiting example, elements of system data, each representing a marketing email, may be categorized to descriptors associated with whether or not the recipient clicked on a link in the email, which of a set of marketing strategies was used in the email, and whether the recipient is a user's personal email address or another email address such as a work or school email address. In this example, a single element of system data may be categorized to a plurality of descriptors, such as a first descriptor associated with a user clicking a link, a second descriptor associated with a particular marketing strategy, and a third descriptor associated with a recipient being a personal email address. In this example, a quantitative value may be calculated by finding the number of elements of system data that are categorized to both click throughs and personal email address recipients. In this example, a quantitative value may represent the number of times an email was sent to a personal email address and there was a click through.

Alternatively, in this example, a quantitative value may be calculated by finding the number of elements of system data that are categorized to either marketing strategy A or marketing strategy B. In this example, a quantitative value may represent the number of emails that use either marketing strategy A or marketing strategy B.

Still referring to FIG. 1, in some embodiments, processor 104 may calculate quantitative value as a function of weightings associated with elements of system data. In some embodiments, processor 104 may calculate quantitative value by adding weightings associated with each element of system data categorized to a certain descriptor. In a non-limiting example, elements of system data, each representing a particular day, may be categorized to descriptors associated with whether or not a user went to the gym on that day. In this example, each element of system data may be weighted based on how long the user was at the gym on that day (such as a weighting equal to the number of minutes the user spent at the gym on that day), and processor 104 may calculate quantitative value by adding the weightings associated with each element of system data categorized to a descriptor associated with days the user went to the gym. In some embodiments, elements of system data may be assigned weightings based on the descriptors they are categorized to. In a non-limiting example, elements of system data, each representing a marketing email, may be categorized to descriptors associated with whether or not the recipient clicked on a link in the email and whether or not the recipient address is a personal email address. In this example, a weighting of 1.2 may be applied to elements of system data categorized to a descriptor associated with personal email addresses, and a weighting of 1 may be applied to elements of system data categorized to a descriptor associated with all other email addresses. In this example, processor 104 may calculate quantitative value by adding the weightings associated with each element of system data categorized to a descriptor associated with click throughs.

Still referring to FIG. 1, in some embodiments, apparatus 100 may use a quantitative value machine learning model to determine a quantitative value. In some embodiments, quantitative value machine learning model may include a supervised machine learning model. In some embodiments, quantitative value machine learning model may be trained on a dataset including historical system data, associated with historical quantitative values. Historical system data may be gathered and manipulated using the methods for gathering and manipulating system data described above. In some embodiments, training quantitative value machine learning model may include iteratively calculating an error function, modifying a plurality of parameters based on the error function, and evaluating a new input/output pair. In some embodiments, quantitative value machine learning model may receive as an input system data and may output a quantitative value.

Still referring to FIG. 1, in some embodiments, apparatus 100 may determine a descriptor ratio 136 by taking a ratio of the first quantitative value and the second quantitative value. In some embodiments, apparatus 100 may include at least a processor 104 and memory 108 communicatively connected to the at least processor 104, the memory 108 containing instructions 112 configuring the at least processor 104 to determine a descriptor ratio 136 by taking a ratio of the first quantitative value and the second quantitative value.

Still referring to FIG. 1, in some embodiments, first quantitative value is non-zero. In some embodiments, second quantitative value is non-zero. In some embodiments, non-zero quantitative values may prevent errors caused by dividing by zero. Descriptor ratio may be expressed as, in non-limiting examples, a fraction, a decimal value, or a ratio.

Still referring to FIG. 1, in some embodiments, descriptor ratio may include a ratio of more than two quantitative values. In a non-limiting example, 4 quantitative values may be calculated by finding the number of elements of system data associated with a descriptor, where each descriptor is associated with downloads of a particular software package. In this example, descriptor ratio may be "4:3:8:6" if the software packages are downloaded in that ratio.

Still referring to FIG. 1, in some embodiments, apparatus 100 may determine a growth model 140 as a function of descriptor ratio 136. In some embodiments, apparatus 100 may include at least a processor 104 and memory 108 communicatively connected to the at least processor 104, the memory 108 containing instructions 112 configuring the at least processor 104 to determine growth model 140 as a function of descriptor ratio 136.

Still referring to FIG. 1, as used herein, a "growth model" is a model of a relationship between descriptor ratio and another metric. In some embodiments, growth model may include a temporal growth model. In some embodiments, calculating growth model 140 may include calculating multiple descriptor ratios, each associated with a particular value or range of another metric such as time. As used herein, a "temporal growth model" is a model of a relationship between descriptor ratio and time. In a non-limiting example, descriptor ratio 136 may include a ratio of downloads of a particular software package in a particular month with downloads of a broader category of software packages in that month. In this example, processor 104 may calculate a plurality of descriptor ratios comparing downloads of the software package in question with downloads of the broader category of software packages, with each descriptor ratio representing a particular month. In this example, processor 104 may calculate growth model by finding a relationship between descriptor ratio and time. In some embodiments, growth model 140 may include a model of a relationship between descriptor ratio 136 and a metric other than time. In a similar example to the software package example immediately above, processor 104 may calculate a plurality of descriptor ratios comparing downloads of the software package in question with downloads of the broader category of software packages, with each descriptor ratio representing a particular version of the software package. In this example, processor 104 may calculate growth model by finding a relationship between descriptor ratio and software package version. At each iteration, the functionality of apparatus 100, including processor 104, may be improved at least by the increase in accuracy of the calculation of growth model 140 as at each iteration there is an improvement in the accuracy of finding relationships between descriptor ratio and other metrics.

Still referring to FIG. 1, in some embodiments, a supervised machine learning algorithm may be used to determine a growth model. Such a machine learning model may be trained on a data set including descriptor ratios associated with another metric of interest. For example, in a temporal growth model, a machine learning model may be trained on a data set including descriptor ratios associated with points in time. In some embodiments, metrics of interest such as points in time may be derived from system data used to determine descriptor ratios. In a non-limiting example, if several descriptor ratios are calculated and used to determine a temporal growth model, where each descriptor ratio is determined based on system data from a particular month, then a descriptor ratio may be associated with a time point at the midpoint of the relevant month in the training data set. In non-limiting examples, batch gradient descent or stochastic gradient descent algorithms may be used to find (or approximate) a correct relationship in, for instance, a linear regression problem. In some embodiments, more complex regression models (such as locally weighted linear regression or a regression model other than linear regression) may be used. In some embodiments, a plurality of machine learning regression algorithms may be used to generate growth models and growth model 140 may be selected from the results. Such a selection may be based on, in a non-limiting example, the degree to which the model fits the data.

Still referring to FIG. 1, in a non-limiting example, a growth model may be the same or substantially the same as a growth model described in U.S. patent application Ser. No. 18/141,725, filed on May 1, 2023, titled "APPARATUS AND A METHOD FOR HIGHER-ORDER GROWTH MODELING," and/or U.S. patent application Ser. No. 18/414,835, filed on Jan. 17, 2024, titled "APPARATUS AND METHODS FOR HIGH-ORDER SYSTEM GROWTH MODELING," each of which is incorporated by reference herein in its entirety.

Still referring to FIG. 1, in some embodiments, apparatus 100 may generate a growth model modification 144 as a function of growth model 140. In some embodiments, apparatus 100 may include at least a processor 104 and memory 108 communicatively connected to the at least processor 104, the memory 108 containing instructions 112 configuring the at least processor 104 to generate a growth model modification 144 as a function of growth model 140. In some embodiments, processor 104 may generate a plurality of growth model modifications 144.

Still referring to FIG. 1, in some embodiments, growth model modification 144 applied to growth model 140 may include an extrapolation of growth model 140 into the future. In a non-limiting example, growth model 140 may include a model of the relationship between the ratio of mentions of brand A on social media with mentions of category of brands B on social media, with the growth model being determined based on descriptor ratios 136 each associated with data from a particular month. In this example, growth model modification 144 may include applying growth model 140 over a broader period of time such as into the future. Similarly, in some embodiments, growth model modification 144 applied to growth model 140 may include an extrapolation of growth model modification in a direction where data is not available. In a non-limiting example, growth model 140 may model the relationship between the ratio of downloads of software package A to downloads of category of software packages B, with the version of software package A. In this example, growth model modification 144 may include extrapolating growth model 140 to predict descriptor ratio in a situation where a major update to software package A is shipped.

Still referring to FIG. 1, in some embodiments, growth model modification 144 may include changing growth model 140 as though the state of the underlying data occurred. In a non-limiting example, elements of system data may each represent a bill, and these may be categorized to descriptors associated with whether or not the bill has been paid. In this example, descriptor ratio may include a ratio of the sum of weights associated with paid bills with total bills, where bill weight is determined by the dollar amount of each bill. In this example, growth model 140 may include a model of this ratio over time. In this example, growth model modification 144 may include changing growth model 140 to simulate a scenario in which a major outstanding bill is paid.

Still referring to FIG. 1, in some embodiments, growth model modification 144 may include modifying growth model 140 as though a different strategy were adopted. In a non-limiting example, growth model 140 may include a model of the relationship between the ratio of downloads of software package A to downloads of any of category of software packages B and time. In this example, growth model modification 144 may include modifying the growth rate to mimic or more closely resemble that of a similar software package that follows a different marketing strategy, update cadence, or other strategy.

Still referring to FIG. 1, in some embodiments, growth model modification 144 may include modifying growth model 140 such that inapplicable data points are removed. In a non-limiting example, growth model 140 may include a model of the relationship between the ratio of downloads of software package A to downloads of any of category of software packages B and time. In this example, growth model modification 144 may include removal of early descriptor ratios from the data set used to calculate the growth model if, for example, those early descriptor ratios were from before an update that fundamentally changed the software and are no longer useful for calculating the trajectory of growth of descriptor ratio 136.

Still referring to FIG. 1, in some embodiments, apparatus 100 may determine a visual element data structure. In some embodiments, apparatus 100 may include at least a processor 104 and memory 108 communicatively connected to the at least processor 104, the memory 108 containing instructions 112 configuring the at least processor 104 to determine a visual element data structure.

Still referring to FIG. 1, in some embodiments, a visual element data structure may include a visual element. In some embodiments, a visual element data structure may include a rule for displaying visual element. In some embodiments, a visual element data structure may be determined as a function of growth model 140 and/or growth model modification 144. In some embodiments, a visual element data structure may be determined as a function of an item from the list consisting of system data 116, categorized system data 128, quantitative value 132, descriptor ratio 136, growth model 140, and growth model modification 144. In a non-limiting example, a visual element data structure may be generated such that visual element describing or highlighting growth model 140 and/or growth model modification 144 is displayed to a user. In another non-limiting example, a visual element data structure may be generated such that visual element includes a chart that depicts a relationship between descriptor ratio 136 and time. In another non-limiting example, a visual element data structure may be generated such that visual element includes text identifying formula of growth model 140.

Still referring to FIG. 1, in some embodiments, visual element may include one or more elements of text, images, shapes, charts, particle effects, interactable features, and the like. In a non-limiting example, a visual element may include a chart depicting growth model 140 and growth model 140 as altered by growth model modification 144.

Still referring to FIG. 1, a visual element data structure may include rules governing if or when visual element is displayed. In a non-limiting example, a visual element data structure may include a rule causing a visual element describing growth model 140 and/or growth model modifi-cation 144 to be displayed when a user selects growth model 140 and/or growth model modification 144 using a GUI.

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously.

Still referring to FIG. 1, a visual element data structure rule may apply to a single visual element or datum, or to more than one visual element or datum. A visual element data structure may categorize data into one or more catego-ries and may apply a rule to all data in a category, to all data in an intersection of categories, or all data in a subsection of a category (such as all data in a first category and not in a second category). As a non-limiting example, elements of system data may be categorized such that each is identified by an "x" on a graph. A visual element data structure may rank data or assign numerical values to them. As a non-limiting example, a visual element data structure may rank descriptor ratios 136 by how high they are. A numerical value may, for example, measure the degree to which a first datum is associated with a category or with a second datum. A visual element data structure may apply rules based on a comparison between a ranking or numerical value and a threshold. As a non-limiting example, data points on a chart may have different sizes depending on their weight. Rank-ings, numerical values, categories, and the like may be used to set visual element data structure rules. Similarly, rankings, numerical values, categories, and the like may be applied to visual elements, and visual elements may be applied based on them. As an example, multiple visual elements may be given rankings based on how important and/or relevant they are, and the highest ranking visual element may be dis-played.

Still referring to FIG. 1, in some embodiments, visual element may be interacted with. For example, visual element may include an interface, such as a button or menu. In some embodiments, visual element may be interacted with using a user device such as a smartphone.

Still referring to FIG. 1, in some embodiments, apparatus 100 may determine visual element. In some embodiments, apparatus 100 may include at least a processor 104 and a memory 108 communicatively connected to the at least processor 104, the memory 108 containing instructions 112 configuring the at least processor 104 to determine visual element.

Still referring to FIG. 1, in some embodiments, apparatus 100 may display visual element to user. In some embodi-ments, apparatus 100 may include at least a processor 104 and a memory 108 communicatively connected to the at least processor 104, the memory 108 containing instructions 112 configuring the at least processor 104 to display visual element to user.

Still referring to FIG. 1, in some embodiments, apparatus 100 may transmit visual element data structure to a remote device. In some embodiments, remote device may include a user device. In some embodiments, apparatus 100 may include at least a processor 104 and a memory 108 com-municatively connected to the at least processor 104, the memory 108 containing instructions 112 configuring the at least processor 104 to transmit visual element data structure to user device. In some embodiments, visual element data structure may configure user device to display visual ele-ment. In some embodiments, visual element data structure may cause an event handler to be triggered in an application of user device such as a web browser. In some embodiments, triggering of an event handler may cause a change in an application of user device such as display of visual element.

Still referring to FIG. 1, in some embodiments, apparatus 100 may transmit visual element to a display. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, in some embodiments, a visual element may include a comparison between growth model 140 and a version of growth model 140 as altered by growth model modification 144. For example, a visual element may depict a line fit to the data of growth model 140 changing in response to growth model modification 144.

Still referring to FIG. 1, in some embodiments, a visual element may include a recommendation based on growth model 140 and/or growth model modification 144. In a non-limiting example, growth model 140 and growth model modification 144 may indicate substantially different rates of change of descriptor ratio 136 based on which strategy is selected (as described above). In this example, a visual element may recommend one strategy over another.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, a system data 116 data structure may include a bool value representing whether a link in an email was clicked. In some embodiments, data in a data structure may be organized in a linked list, tree, array, matrix, tenser, and the like. In a non-limiting example, system data 116 may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, a system data data structure may be read and used to determine which descriptors it should be categorized to. As another non-limiting example, descriptor ratio data structure may be read and used to calculate growth model 140.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

Figure 2:
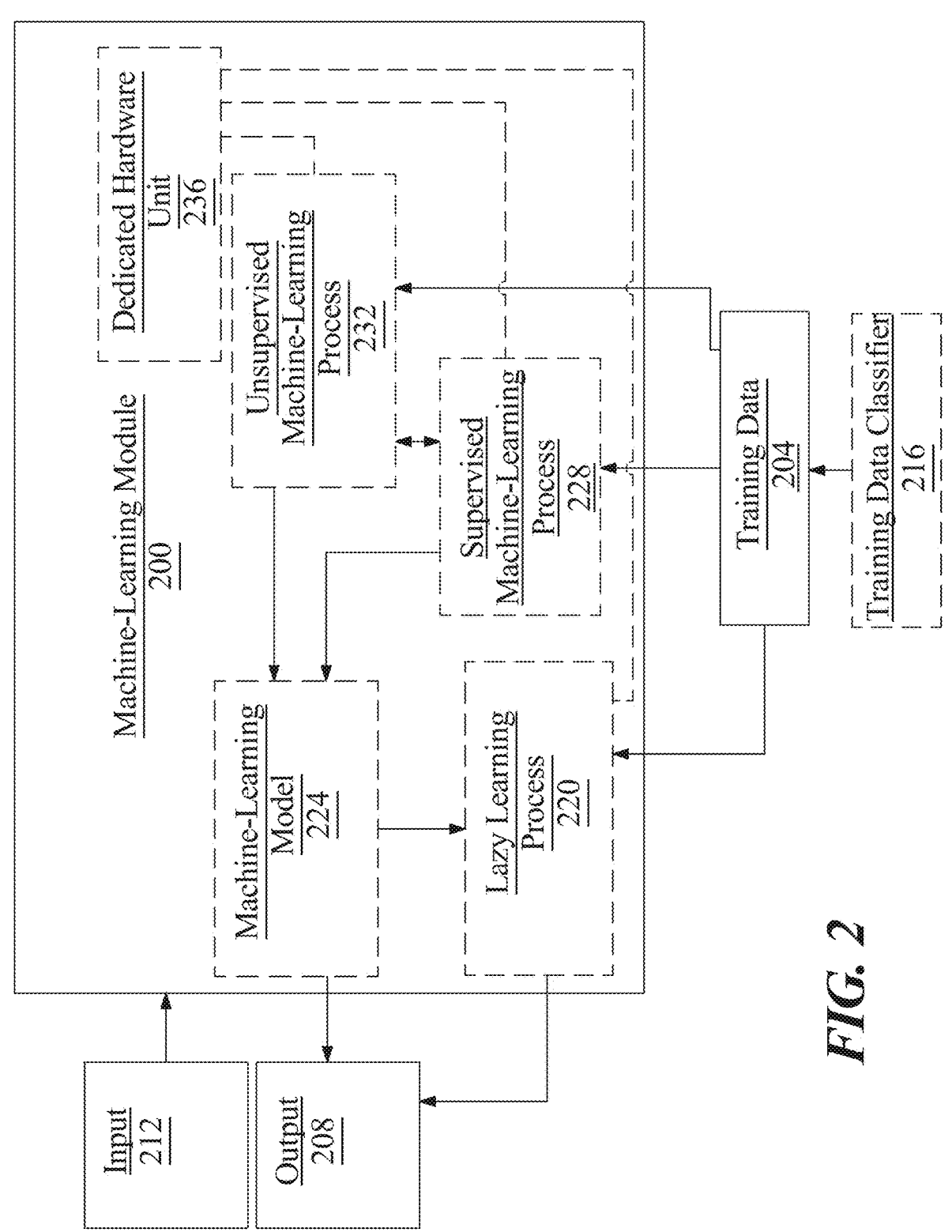
FIG. 2 is a diagram depicting an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, system data may be input into descriptor classifier and descriptor classifier may output categorized system data.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to descriptors.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include system data 116 as described above as inputs, categorized system data 128 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
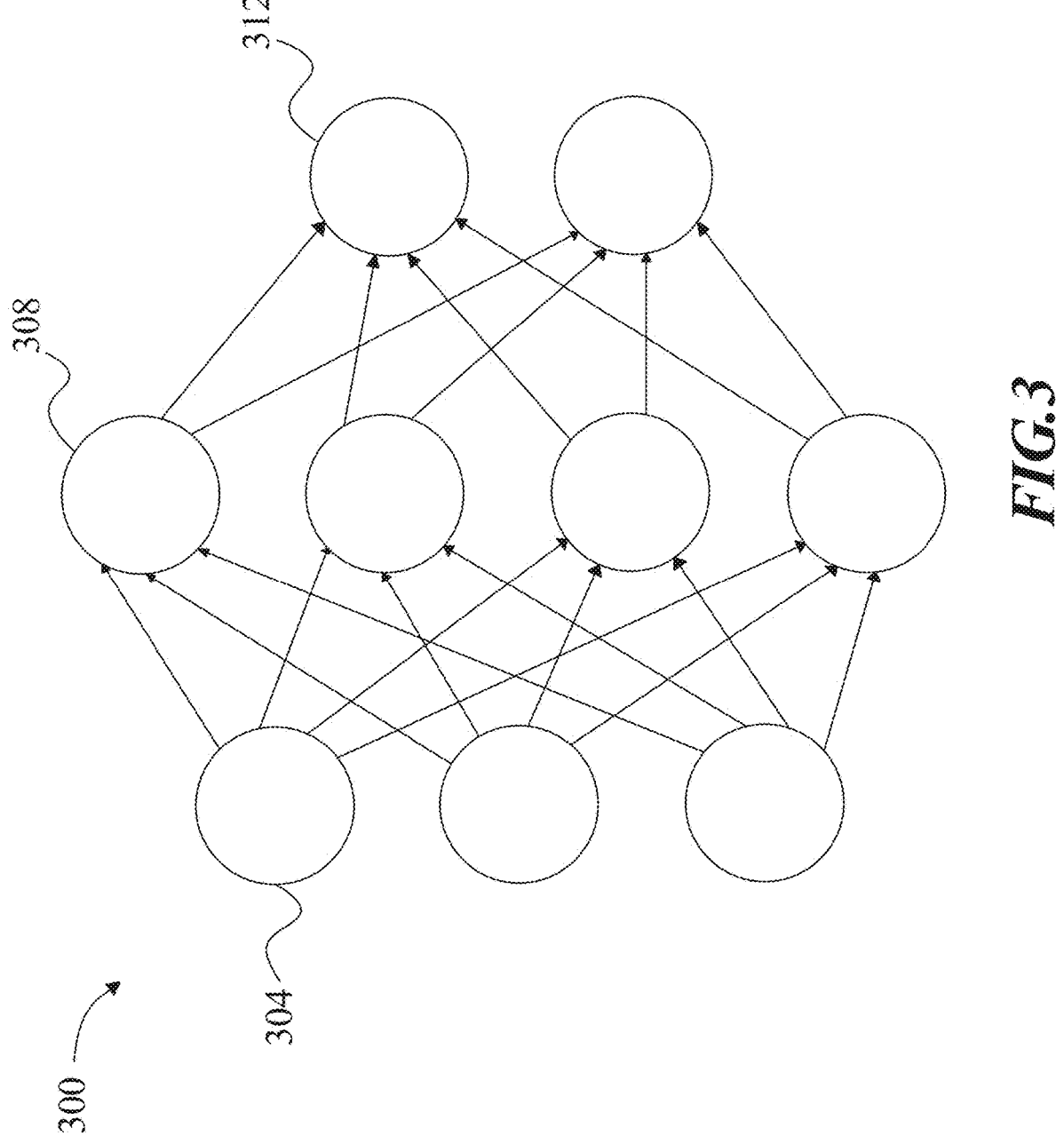
FIG. 3 is a diagram depicting an exemplary neural network.

Referring now to FIG. 3, an exemplary embodiment of neural network 300 is illustrated. A neural network 300, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
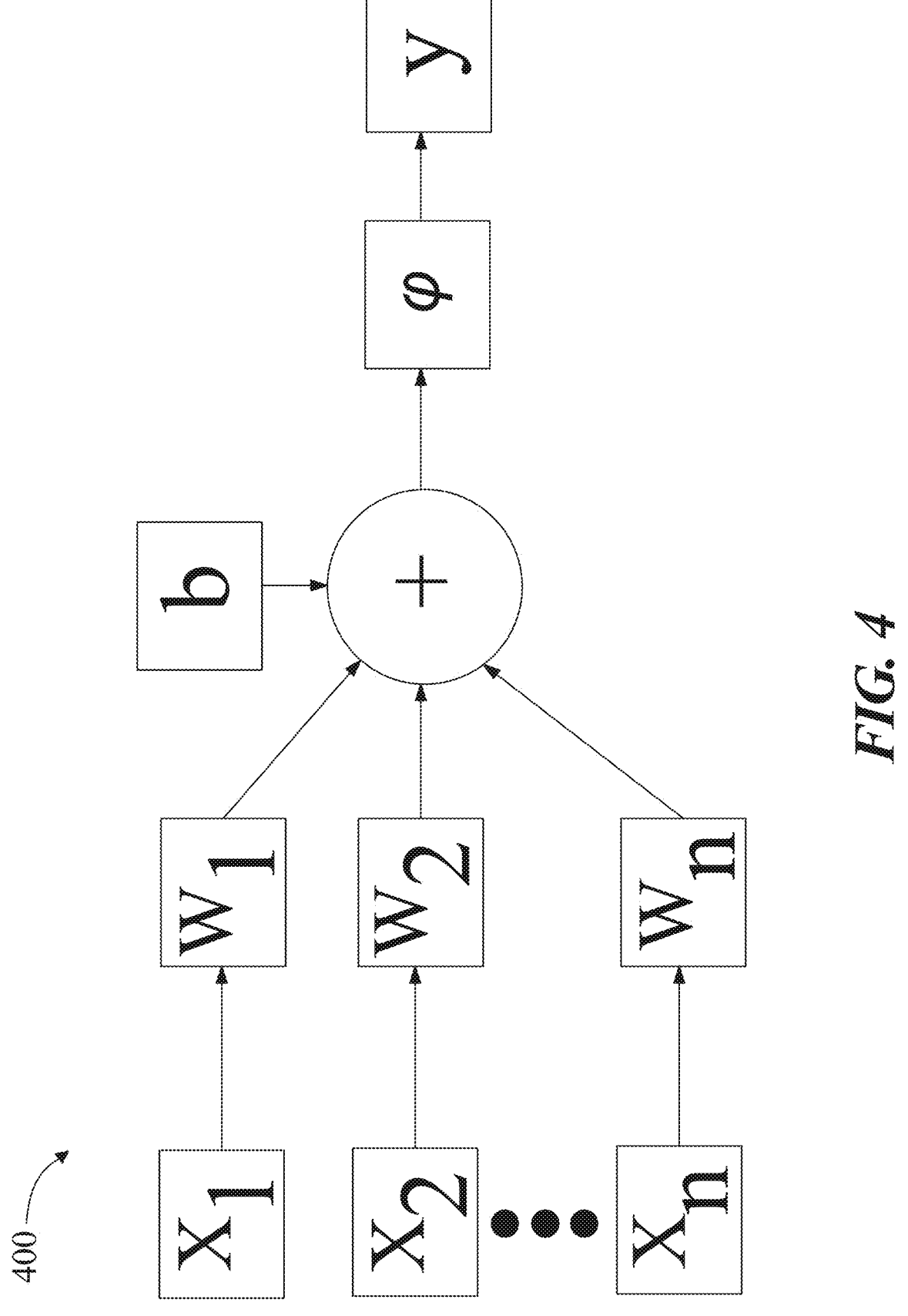
FIG. 4 is a diagram depicting an exemplary neural network node.

Referring now to FIG. 4, an exemplary embodiment of a node 400 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\mathrm{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 5, an exemplary embodiment of a method 500 of state change implementation is illustrated. In some embodiments, one or more steps of method 500 may be implemented, without limitation, as described above in reference to FIG. 1. In some embodiments, one or more steps of method 500 may be performed using at least a processor.

Still referring to FIG. 5, in some embodiments, method 500 may include obtaining system data including a plurality of elements 505.

Still referring to FIG. 5, in some embodiments, method 500 may include classifying each element of the plurality of elements of the system data to a descriptor of a plurality of descriptors 510. In some embodiments, classifying elements of entity data into descriptors includes inputting elements of entity data into a descriptor classifier; and receiving a plurality of classified elements of entity data from the descriptor classifier.

Still referring to FIG. 5, in some embodiments, method 500 may include determining a first quantitative value as a function of the elements classified to a first descriptor 515. In some embodiments, at least one element of the plurality of elements of the system data is classified to the first descriptor.

Still referring to FIG. 5, in some embodiments, method 500 may include determining a second quantitative value as a function of the elements classified to a second descriptor 520. In some embodiments, at least one element of the plurality of elements of the system data is classified to the second descriptor. In some embodiments, method 500 may further include determining a third quantitative value as a function of the elements classified to a third descriptor.

Still referring to FIG. 5, in some embodiments, method 500 may include determining a descriptor ratio by taking a ratio of the first quantitative value and the second quantitative value 525. In some embodiments, determining the first quantitative value includes finding the number of elements classified to the first descriptor, and determining the second quantitative value includes finding the number of elements classified to the second descriptor. In some embodiments, descriptor ratio is determined by taking a ratio of first quantitative value, second quantitative value, and third quantitative value.

Still referring to FIG. 5, in some embodiments, method 500 may include determining a growth model as a function of the descriptor ratio 530. In some embodiments, determining a growth model as a function of the descriptor ratio includes determining a change in a descriptor ratio from a first time point to a second time point.

Still referring to FIG. 5, in some embodiments, method 500 may include generating a growth model modification as a function of the growth model 535. In some embodiments, generating a growth model modification as a function of the growth model includes predicting a change in a descriptor ratio from a third time point to a fourth time point based on the change in the descriptor ratio from the first time point to the second time point.

Still referring to FIG. 5, in some embodiments, method 500 may include determining a visual element data structure as a function of the machine learning model form; and transmitting the visual element data structure to a user device. In some embodiments, method 500 may include configuring a remote device to display the growth model modification. In some embodiments, visual element data structure configures the user device to display a visual element to a user. In some embodiments, visual element depicts a comparison between the growth model and a modified growth model incorporating the growth model modification.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
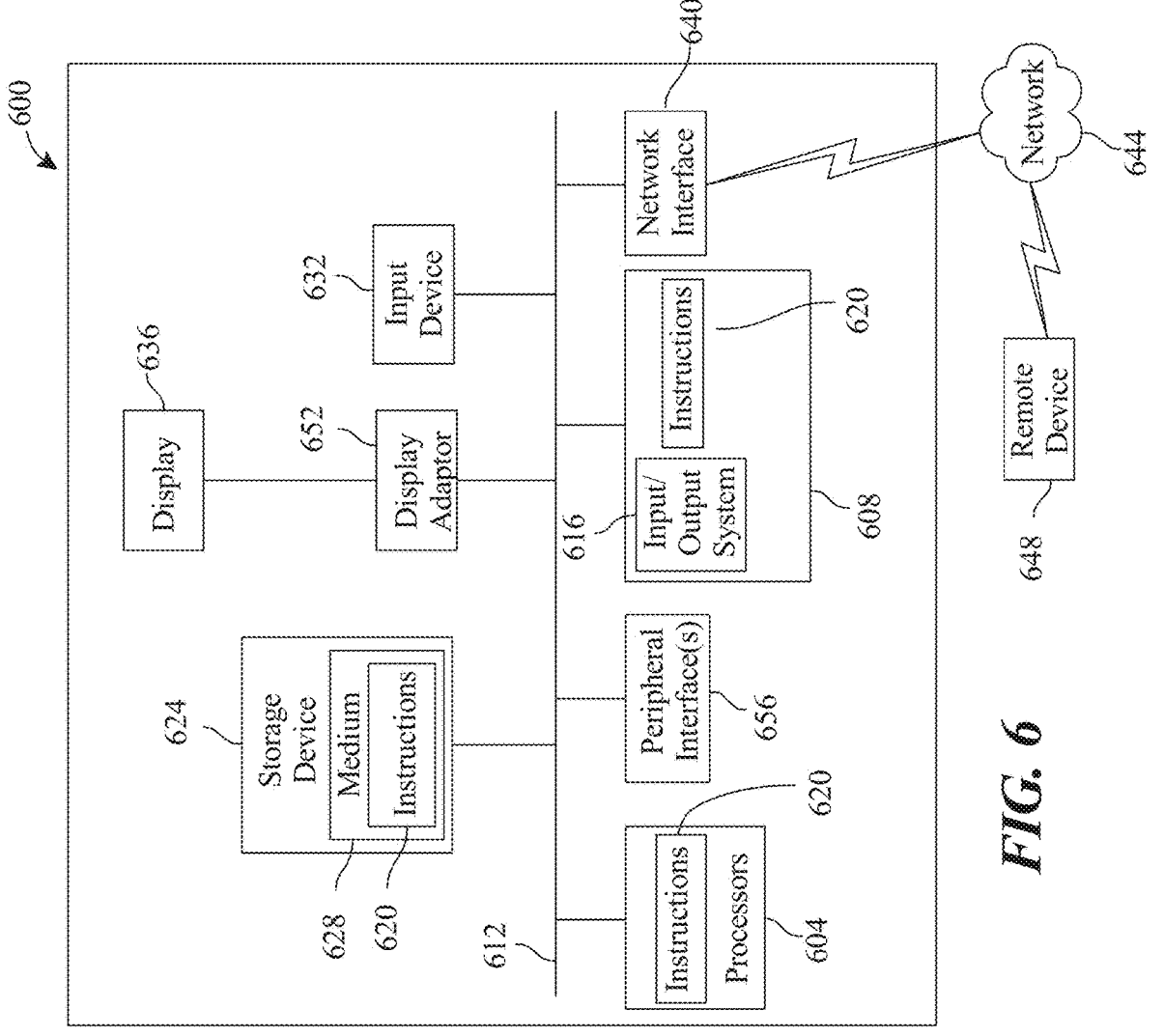
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for state change implementation, the apparatus comprising:

at least a processor; and a memory communicatively connected to the at least a processor, the memory containing instructions configuring the at least a processor to:

obtain system data including a plurality of elements, wherein the system data is information gathered from a device fingerprint which allows a user device to be tracked across a network;

determine one or more elements of the plurality of elements using a machine learning model, wherein determining the one or more elements of the plurality of elements using the machine learning model comprises:

receiving language classification training data wherein the language classification data comprises correlations between at least a language element input, one or more intermediate layers of nodes, and at least an associated language element output layer of nodes;

training the machine learning model as a function of the received language classification training data;

adjusting one or more connections and one or more weights between nodes in adjacent layers of the machine learning model;

updating the output layer of nodes as a function of the adjusted weights between nodes in adjacent layers of the machine learning model;

classifying one or more elements of the plurality of elements to a descriptor of a plurality of descriptors using the trained machine learning model; and retraining the machine learning model as a function of the classified elements;

determine a first quantitative value as a function of the elements classified to a first descriptor;

determine a second quantitative value as a function of the elements classified to a second descriptor;

determine a descriptor ratio by taking a ratio of the first quantitative value and the second quantitative value;

determine a growth model as a function of the descriptor ratio, wherein the growth model comprises a temporal growth model which relates descriptor ratio and time;

generate a growth model modification as a function of the growth model, wherein generating the growth model modification comprises modifying a growth rate to mimic a second plurality of elements wherein the second plurality of elements has at least a same element as the plurality of elements; and configure a remote device to display the growth model modification.

2. The apparatus of claim 1, wherein classifying elements of entity data into descriptors comprises:

inputting elements of entity data into a descriptor classifier; and receiving a plurality of classified elements of entity data from the descriptor classifier.

3. The apparatus of claim 1, wherein at least one element of the plurality of elements of the system data is classified to the first descriptor; wherein at least one element of the plurality of elements of the system data is classified to the second descriptor.

4. The apparatus of claim 1, wherein determining the first quantitative value comprises finding a number of elements classified to the first descriptor; wherein determining the second quantitative value comprises finding the number of elements classified to the second descriptor.

5. The apparatus of claim 1, wherein determining a growth model as a function of the descriptor ratio comprises determining a change in a descriptor ratio from a first time point to a second time point.

6. The apparatus of claim 5, wherein generating a growth model modification as a function of the growth model comprises predicting a change in a descriptor ratio from a third time point to a fourth time point based on the change in the descriptor ratio from the first time point to the second time point.

7. The apparatus of claim 1, wherein the memory contains instructions configuring the at least a processor to determine a third quantitative value as a function of the elements classified to a third descriptor; wherein the descriptor ratio is determined by taking a ratio of the first quantitative value, the second quantitative value, and the third quantitative value.

8. The apparatus of claim 1, wherein the memory contains instructions configuring the at least a processor to:

determine a visual element data structure as a function of the trained machine learning model; and configure the remote device using the visual element data structure.

9. The apparatus of claim 8, wherein the visual element data structure configures the remote device to display a visual element to a user.

10. The apparatus of claim 9, wherein the visual element depicts a comparison between the growth model and a modified growth model incorporating the growth model modification.

11. A method for state change implementation, comprising:

using at least a processor, obtaining system data including a plurality of elements, wherein the system data is information gathered from a device fingerprint which allows a user device to be tracked across a network;

using the at least a processor, determine one or more elements of the plurality of elements using a machine learning model, wherein determining the one or more elements of the plurality of elements using the machine learning model comprises:

receiving language classification training data wherein the language classification data comprises correlations between at least a language element input, one or more intermediate layers of nodes, and at least an associated language element output layer of nodes;

training the machine learning model as a function of the received language classification training data;

adjusting one or more connections and one or more weights between nodes in adjacent layers of the machine learning model;

updating the output layer of nodes as a function of the adjusted weights between nodes in adjacent layers of the machine learning model;

classifying one or more elements of the plurality of elements to a descriptor of a plurality of descriptors using a trained machine learning model; and retraining the machine learning model as a function of the classified elements;

using the at least a processor, determining a first quantitative value as a function of the elements classified to a first descriptor;

using the at least a processor, determining a second quantitative value as a function of the elements classified to a second descriptor;

using the at least a processor, determining a descriptor ratio by taking a ratio of the first quantitative value and the second quantitative value;

using the at least a processor, determining a growth model as a function of the descriptor ratio, wherein the growth model comprises a temporal growth model which relates descriptor ratio and time, wherein generating a growth model modification comprises modifying a growth rate to mimic a second plurality of elements wherein the second plurality of elements has at least a same element as the plurality of elements; and using the at least a processor, configuring a remote device to display the growth model modification.

12. The method of claim 11, wherein classifying elements of entity data into descriptors comprises:

using the at least a processor, inputting elements of entity data into a descriptor classifier; and using the at least a processor, receiving a plurality of classified elements of entity data from the descriptor classifier.

13. The method of claim 11, wherein at least one element of the plurality of elements of the system data is classified to the first descriptor; wherein at least one element of the plurality of elements of the system data is classified to the second descriptor.

14. The method of claim 11, wherein determining the first quantitative value comprises finding a number of elements classified to the first descriptor; wherein determining the second quantitative value comprises finding the number of elements classified to the second descriptor.

15. The method of claim 11, wherein determining a growth model as a function of the descriptor ratio comprises determining a change in a descriptor ratio from a first time point to a second time point.

16. The method of claim 15, wherein generating a growth model modification as a function of the growth model comprises predicting a change in a descriptor ratio from a third time point to a fourth time point based on the change in the descriptor ratio from the first time point to the second time point.

17. The method of claim 11, further comprising determining a third quantitative value as a function of the elements classified to a third descriptor, wherein the descriptor ratio is determined by taking a ratio of the first quantitative value, the second quantitative value, and the third quantitative value.

18. The method of claim 11, further comprising:

using the at least a processor, determining a visual element data structure as a function of the trained machine learning model; and using the at least a processor, configuring the remote device using the visual element data structure.

19. The method of claim 18, wherein the visual element data structure configures the remote device to display a visual element to a user.

20. The method of claim 19, wherein the visual element depicts a comparison between the growth model and a modified growth model incorporating the growth model modification.

* * * * *